(12) United States Patent
Bae et al.

(10) Patent No.: US 8,890,658 B2
(45) Date of Patent: Nov. 18, 2014

(54) RFID SYSTEM AND COMMUNICATION METHOD THEREOF

(75) Inventors: Ji Hoon Bae, Daejeon-si (KR); Chan Won Park, Daejeon-si (KR); Hyung Chul Park, Seoul (KR); Jong Suk Chae, Daejeon-si (KR); Cheol Sig Pyo, Daejeon-si (KR)

(73) Assignees: Electronics and Telecommunications Research Institute, Daejeon-Si (KR); Seoul National University of Technology Center for Industry Collaboration, Seoul (KR)

( * ) Notice: Subject to any disclaimer, the term of this patent is extended or adjusted under 35 U.S.C. 154(b) by 345 days.

(21) Appl. No.: 13/584,967

(22) Filed: Aug. 14, 2012

(65) Prior Publication Data

US 2013/0106580 A1 May 2, 2013

(30) Foreign Application Priority Data

Oct. 31, 2011 (KR) .................. 10-2011-0112245
Aug. 10, 2012 (KR) .................. 10-2012-0087810

(51) Int. Cl.
*G06K 7/01* (2006.01)
*H04L 1/00* (2006.01)
*G06K 19/07* (2006.01)
*H04L 25/49* (2006.01)
*H04L 27/34* (2006.01)

(52) U.S. Cl.
CPC .......... *H04L 1/0045* (2013.01); *G06K 19/0717* (2013.01); *H04L 25/4917* (2013.01); *H04L 27/34* (2013.01); *H04L 1/0041* (2013.01); *H04L 1/0057* (2013.01)
USPC ....... 340/10.1; 340/870.18; 455/42; 455/108; 375/333

(58) Field of Classification Search
CPC ........... G06K 7/0008; G06K 19/0723; G06K 19/07749; G06K 2017/0045; G06K 19/0717; G07C 9/00111; H04L 25/4917; H04L 27/34; H04L 1/0057; H04L 1/0041; H04L 1/0045
USPC ..................... 340/10.1, 870.18; 455/42, 108; 375/222, 333, 371; 370/338, 480
See application file for complete search history.

(56) References Cited

U.S. PATENT DOCUMENTS

| 5,649,296 | A | 7/1997 | MacLellan et al. | |
|---|---|---|---|---|
| 6,456,668 | B1 * | 9/2002 | MacLellan et al. | 375/283 |
| 7,054,296 | B1 * | 5/2006 | Sorrells et al. | 370/338 |
| 2005/0182761 | A1 * | 8/2005 | Kato | 707/3 |
| 2008/0197982 | A1 * | 8/2008 | Sadr | 340/10.4 |
| 2008/0274697 | A1 * | 11/2008 | Ito | 455/42 |
| 2009/0146792 | A1 * | 6/2009 | Sadr et al. | 340/10.3 |
| 2009/0161808 | A1 * | 6/2009 | Cheong et al. | 375/371 |
| 2013/0028269 | A1 * | 1/2013 | Limberg | 370/474 |

FOREIGN PATENT DOCUMENTS

WO    WO 99/34526    7/1999

* cited by examiner

*Primary Examiner* — Omer S Khan
(74) *Attorney, Agent, or Firm* — Rabin & Berdo, P.C.

(57) ABSTRACT

An RFID system using an M pulse amplitude modulation (M-PAM) or M quadrature amplitude modulation (M-QAM) scheme using a plurality of load-modulators, a plurality of antennas, and a communication method thereof are provided. The RFID system includes: an RFID tag; and a reader device communicating with the RFID device, wherein the RFID tag includes: N load-modulators an N antennas communicating with the reader device in any one scheme of M-pulse amplitude modulation (M-PAM) and M-quadrature amplitude modulation (M-QAM) in which modulation of an M level is performed and operated corresponding to the M level.

17 Claims, 8 Drawing Sheets

FIG. 3A

|  | Response |
|---|---|
| # of bits | 16 |
| description | RN16 |

FIG. 3B

|  | Header | RN | CRC-16 |
|---|---|---|---|
| # of bits | 1 | 16 | 16 |
| description | 0 | handle |  |

FIG. 3C

|  | Response |
|---|---|
| # of bits | 16 to 288 |
| description | {PC,EPC,CRD-16}OR{0000,truncated EPC,CRC-16} |

RFID SYSTEM AND COMMUNICATION METHOD THEREOF

CROSS-REFERENCE TO RELATED APPLICATIONS

This application claims the benefit of priority of Korean Patent Application Nos. 10-2011-0112245 filed on Oct. 31, 2011 and 10-2012-0087810 filed on Aug. 10, 2012, all of which are incorporated by reference in their entirety herein.

BACKGROUND OF THE INVENTION

1. Field of the Invention

The present invention relates to an RFID system and a communication method thereof, and more particularly, to an RFID system capable of performing high speed data communication between an RFID tag and a reader device, and a communication method thereof.

2. Related Art

Generally, an RFID system indicates a system recognizing tag information stored in an RFID tag by carrier communication between an RFID tag and a reader device. A passive RFID system among the RFID systems indicates a system in which an RFID tag storing object information does not includes a device for communication with a reader device. The RFID tag of the passive RFID system receives a carrier signal form the reader device on a wireless environment to generate its power, thereby performing communication with the reader device based on backscatter.

Since this passive RFID system may provide information of a development object, it may be applied to various fields such as a recognition distance more distant than that of a barcode, simultaneous recognition of a plurality of RFID tags, reading/writing information from/to an RFID tag memory, and the like.

Meanwhile, a region of a technology of the passive RFID system has been gradually expanded from an existing pallet/case level of item recognition to individual item-level-tagging recognition. The RFID system according to the related art has been disclosed in U.S. Pat. No. 5,649,296.

However, in the RFID system according to the related art, in the case in which a technology of the RFID system is applied and expanded to the individual item-level-tagging recognition in accordance with the trend toward the expansion of the function of the RFID system described above, a limitation has been generated in performance and a transmission speed. For example, the following problems are generated.

First, a problem in view of performance in the RFID system according to the related art is that a communication range between the RFID tag and the reader device is short in a low signal to noise ratio (SNR). Second, clear discrimination of auto-correlation of a preamble code that is adopted in the RFID system according to the related art is not present, such that it is difficult to perform long range communication between the RFID tag and the reader device. Third, since the RFID system according to the related art has a transmission speed of 1 Mpbs or less, there is a limitation in satisfying various demands related to high speed recognition of a large number of individual items and reading/writing a large amount of information.

RELATED ART DOCUMENT

Patent Document

U.S. Pat. No. 5,649,296

SUMMARY OF THE INVENTION

The present invention provides an RFID system having an improved structure and communication method so that a long range communication between an RFID tag and a reader device may be made, and a communication method thereof.

The present invention also provides an RFID system having an improved structure and communication method so as to have a high transmission speed exceeding 1 Mbps so that high speed recognition of a large number of individual items and reading/writing a large amount of information may be made, and a communication method thereof.

In an aspect, an RFID system is provided. The RFID system includes: an RFID tag; and a reader device communicating with the RFID device, wherein the RFID tag includes: N load-modulators and communicating with the reader device in any one scheme of M-pulse amplitude modulation (M-PAM) and M-quadrature amplitude modulation (M-QAM) in which modulation of an M level is performed and operated corresponding to the M level.

The RFID tag may further include: a code generating unit adding a parity to data stored in the RFID tag to generate an error correcting code; and a preamble signal generating unit generating a preamble code having auto-correlation characteristics of a delta function, wherein N load-modulators and N antennas may transmit the error correcting code and the preamble code to the reader device in any on scheme of M-pulse amplitude modulation (M-PAM) and M-quadrature amplitude modulation (M-QAM) in which modulation of the M level is performed and operated corresponding to the M level.

The number N of load-modulators according to the M level may be calculated based on the following Equation:

In case of M-PAM: $N=M$

In case of M-QAM: $N=2*\sqrt{M}$

The error correcting code generated in the code generating unit may be an error correcting code generated by adding the parity to the data stored in the RFID tag.

The code generating unit may include: an error correcting code encoder encoding the error correcting code in an error correcting code scheme in which the parity is added to the data stored in the RFID tag to generate a codeword; and an error correcting code setter setting a basic value by selecting any one of a plurality of error correcting codes so that the error correcting code encoder encodes the error correcting code.

The RFID tag may further include: a memory storing the data of the RFID tag therein; a packet generating unit generating a packet for responding to the reader device; a multiplexer combining the error correcting code, the preamble code, and the packet each generated in the code generating unit, the preamble signal generating unit, and the packet generating unit with each other to generate a tag packet signal responding to a command of the reader device.

The RFID tag may further include a thermometer decoder disposed between the multiplexer and the N load-modulators, and the load-modulator may generate a PAM signal of the M level using the thermometer decoder.

The load-modulator may generate a QAM signal of the M level by adjusting a phase of a carrier reflected from the antenna.

The preamble signal generating unit may include a linear feedback shift register (LFSR).

The reader device may include: a preamble detecting unit detecting the preamble code generated in the preamble signal generating unit of the RFID tag; and a decoding unit decoding the error correcting code generated in the code generating unit of the RFID tag.

In another aspect, a communication method of an RFID system including an RFID tag and a reader device communicating with the RFID tag is provided. The communication method includes: (a) adding, in the RFID tag including a load-modulator, a parity to data stored in the RFID tag to generate an error correcting code; (b) generating, in the RFID tag, a preamble code having auto-correlation characteristics of a delta function; (c) transmitting, in the RFID tag, the error correcting code and the preamble code to the reader device using N load-modulators corresponding to an M level in any one scheme of M-pulse amplitude modulation (M-PAM) and M-quadrature amplitude modulation (M-QAM) in which modulation of the M level is performed; and (d) receiving, in the reader device, the error correcting code and the preamble code transmitted in step (c) to detect the preamble code and decode the error correcting code.

In step (c), the number N of load-modulators according to the M level may be calculated based on the following Equation:

In case of M-PAM: N=M

In case of M-QAM: N=2*sqrt(M)

The error correcting code generated in step (a) may be an error correcting code generated by adding the parity to the data stored in the RFID tag.

The RFID tag may further include a thermometer decoder, and in step (c), the load-modulator may generate a PAM signal of the M level using the thermometer decoder.

The RFID tag may further include the N load-modulators and N antennas corresponding to the N load-modulators, and in step (c), the load-modulator may generate a QAM signal of the M level by adjusting a phase of a carrier reflected from the antenna.

BRIEF DESCRIPTION OF THE DRAWINGS

FIGS. 3A to 3C are diagrams showing an example of a tag response defined in the ISO 18000-6C RFID international standard specification.

DESCRIPTION OF EXEMPLARY EMBODIMENTS

Hereinafter, an RFID system and a communication method thereof according to an exemplary embodiment of the present invention will be described in detail with reference to the accompanying drawings.

Figure 1:
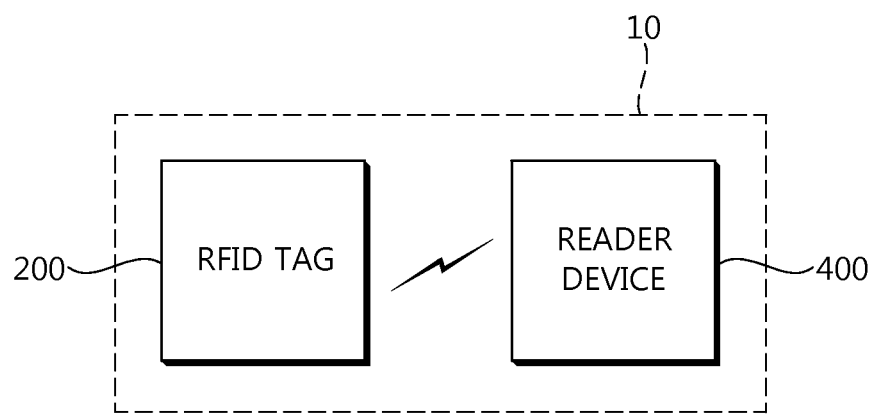
FIG. 1 is a block diagram showing a configuration of an RFID system according to an exemplary embodiment of the present invention.
Figure 2:
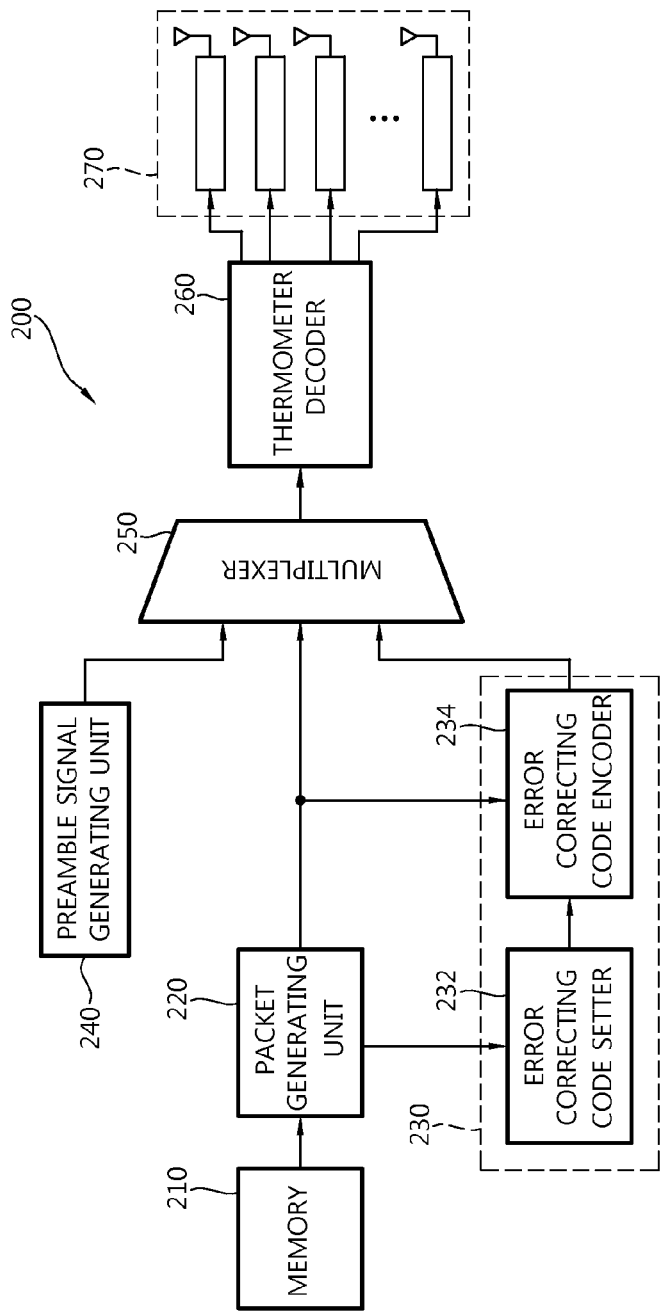
FIG. 2 is a block diagram showing a configuration of an RFID tag of the RFID system according to the exemplary embodiment of the present invention shown in FIG. 1.

FIG. 1 is a block diagram showing a configuration of an RFID system according to an exemplary embodiment of the present invention; and FIG. 2 is a block diagram showing a configuration of an RFID tag of the RFID system according to the exemplary embodiment of the present invention shown in FIG. 1.; and FIG. 3A to 3C are diagrams showing an example of a tag response defined in the ISO 18000-6C RFID international standard specification.

As shown in FIGS. 1 and 2, the RFID tag system 10 according to the exemplary embodiment of the present invention includes an RFID tag 200 and a reader device 400. Here, the RFID tag 200 stores information of an item, or the like, therein and is disposed at various objects such as the item, and the like. The reader device 400 transmits a carrier to the RFID tag 200 to recognize the information of the RFID tag 200.

The RFID tag 200 according to the exemplary embodiment of the present invention includes a memory 210, a packet generating unit 220, a code generating unit 230, a preamble signal generating unit 240, a multiplexer 250, a thermometer decoder 260, and a load-modulator 270. The RFID tag 200 implements high speed data transmission as shown in FIGS. 3A to 3C in any one scheme of M pulse amplitude modulation (M-PAM) and M quadrature amplitude modulation (M-QAM) using an error correcting code generated in the code generating unit 230, a preamble signal generated in the preamble signal generating unit 240, and the load-modulator 270.

FIGS. 3A to 3C shows an example of a tag response defined in the ISO 18000-6C RFID international standard specification. Unlike general wireless communication, a form of data transmitted in the RFID tag 200 is changed according to the demand of the reader device 400.

The memory 210 stores data of the RFID tag 200 therein. That is, the memory 210 stores data including information of the RFID tag 200 that does not include an error correcting code to be described below therein. The data stored in the memory are combined with a parity in a code generating unit 230 to be described below to thereby be generated as the error correcting code.

The packet generating unit 220 generates a packet for transmitting a response to a command of the reader device 400. In addition, the packet generating unit 220 also serves to transmit a control signal as an error correcting code so that a set value may be set in an error correcting code setter 232.

The code generating unit 230 adds the parity to the data stored in the memory 210 to generate the error correcting code. The error correcting code generated in the code generating unit 230 may be an error correcting code generated by adding the parity to the data stored in the memory 210. The code generating unit 230 according to the exemplary embodiment of the present invention includes the error correcting code setter 232 and an error correcting code encoder 234.

The error correcting code setter 232 sets a basic value by selecting any one of a plurality of error correcting codes so that the error correcting code encoder 234 encodes to the error correcting code.

The error correcting code encoder 234 encodes the error correcting code in an error correcting code scheme in which the parity is added to the data stored in the memory 210 to generate a codeword. That is, the error correcting code encoder 234 adds the error correcting code to the data stored in the memory 210 according to the value set from the error correcting code setter 232 to generate a codeword packet.

Particularly, the error correcting code encoder 234 adds the parity to the data stored in the memory 210 to generate the error correcting code and transmit the generated error correcting code to the reader device 400, thereby serving to correct an error in the case in which the error occurs in determining a symbol due to channel noise, other interference signals, and the like, in a process in which the reader device 400 extracts original data.

Referring to <Table 1> as an example of this error correcting code, information transmitted to the reader device 400 is data that should not have an error at all. <Table 1> shows block correcting codes such as a Reed Solomon code having a non-binary cyclic code included in a cyclic code class in which a structure of a code is a cyclic, but all error correcting codes may be used, in addition to the block correcting blocks described in the exemplary embodiment of the present invention.

An encoding scheme of the error correcting code encoder 234 is a scheme of adding several parities to several input symbols. For example, in the case of a (7,4) code, three parity symbols are generated in a unit of four input symbols to generate seven encoded symbols.

Meanwhile, as described in the following <Table 1>, in the error correcting codes, lengths of information signals to which the parity is added in order to correct the error are different. That is, in the case in which the parity is added in a unit of four input symbols, three symbol parities may be added, and at most one symbol error may be corrected. Further, in the case in which the parity is added in a unit of eleven input symbols, four symbol parities may be added, and at most two symbol errors may be corrected. The error correcting code encoder 234 may perform encoding using different codes according to a form, a length, and importance of transmission data of the RFID tag 200. Since this encode scheme may be implemented using the same hardware, additional hardware is not required.

TABLE 1

| The number of coded symbols in which parity is included | The number of input symbols | The number of bits per 1 symbol | The number of symbols of which error may be corrected |
|---|---|---|---|
| 7 | 4 | 3 | 1 |
| 15 | 11 | 4 | 2 |
| 63 | 55 | 6 | 4 |
| 255 | 239 | 8 | 8 |

Figure 4A:
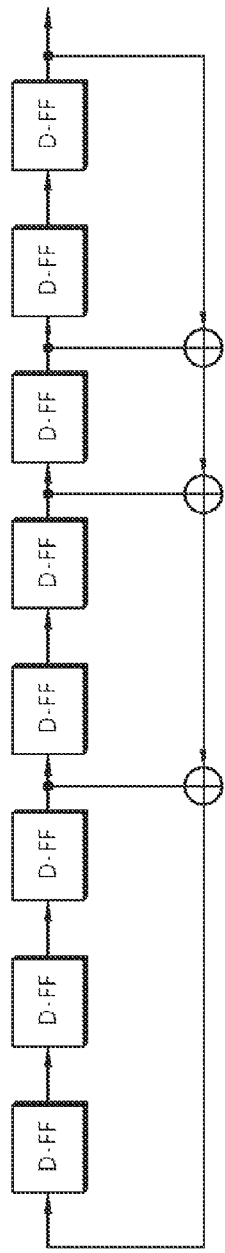
FIGS. 4A and 4B are, respectively, a diagram showing a circuit of a preamble signal generating unit shown in FIG. 2 and a result graph auto-correlation characteristics of the preamble signal generating unit.
Figure 4B:
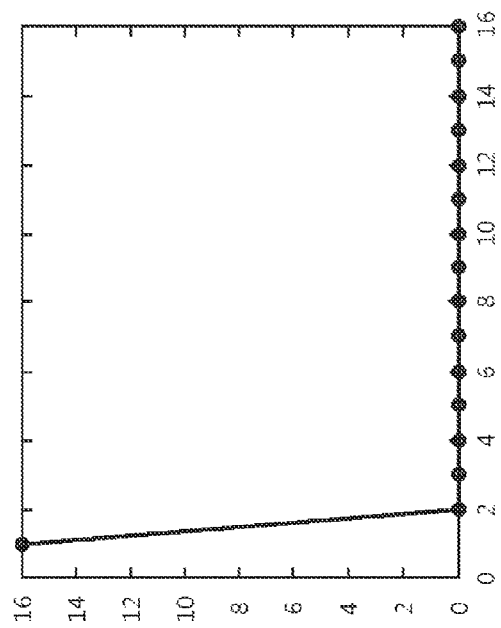
Figure 5:
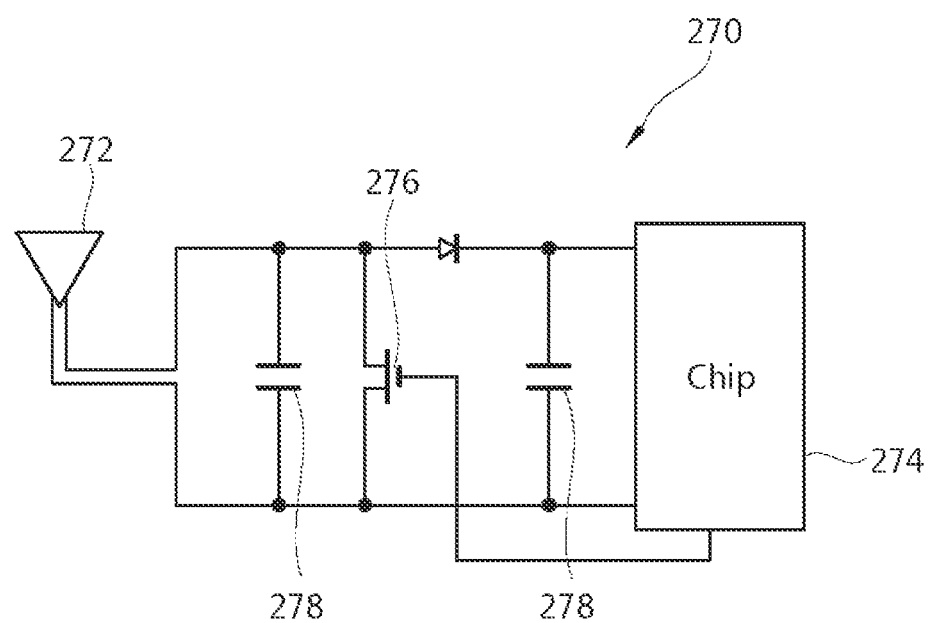
FIG. 5 is a circuit diagram showing a configuration of a load-modulator shown in FIG. 2.
Figure 6:
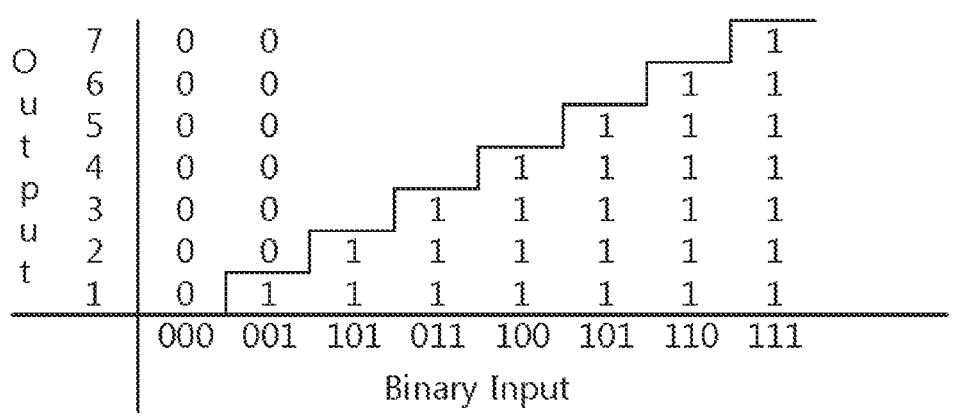
FIG. 6 is a diagram showing an example of a function of a thermometer decoder shown in FIG. 2.

FIGS. 4A and 4B are, respectively, a diagram showing a circuit of a preamble signal generating unit shown in FIG. 2 and a result graph auto-correlation characteristics of the preamble signal generating unit; and FIG. 5 is a circuit diagram showing a configuration of a load-modulator shown in FIG. 2; and FIG. 6 is diagram showing an example of a function of a thermometer decoder shown in FIG. 2.

As shown in FIGS. 4A to 5, the preamble signal generating unit 240 according to the exemplary embodiment of the present invention generates a preamble code having auto-correlation characteristics of a delta function. This preamble code will be described below.

In wireless communication, a preamble is used in order to detect a specific position in a packet, more specifically, a start position of an information signal, or the like. The preamble has a code sequence form using several bits. A maximal length (ML) code and a constant amplitude zero auto-correlation code (CAZAC) code are present in this preamble code. More specifically, the ML code includes an M-code, a gold code, a Kasami code, a PN code, and the like, and the CAZAC code includes a Zadoff-Chu code, a Frank code, a GCL code, and the like.

The preamble signal generating unit 240 according to the exemplary embodiment of the present invention generating the above-mentioned ML code and the CAZAC code includes a linear feedback shift register (LFSR) using a shift register and a feedback circuit and shown in FIG. 4A. The preamble signal generating unit 240 based on the linear feedback shift register according to the exemplary embodiment of the present invention may have significantly simple digital hardware and excellent auto-correlation characteristics.

The graph shown in FIG. 4B is a graph showing a result of auto-correlation characteristics when the preamble signal generating unit 240 is used. In the graph of FIG. 3B, since the result of the auto-correlation characteristics is close to a delta function, the accuracy of detection of the preamble code may be improved.

The multiplexer 250 combines the error correcting code, the preamble code, and the packet each generated in the code generating unit 230, the preamble signal generating unit 240, and the packet generating unit 220 with each other to generate a standardized tag packet signal responding to a command of the reader device 400.

The thermometer decoder 260 allows the load-modulator 270 to perform modulation of an M level. Here, as the thermometer decoder 260 according to the exemplary embodiment of the present invention, a binary-to-thermometer decoder is used. A function of this thermometer decoder 260 is an example of three bits with reference to FIG. 6.

The load-modulator 270 transmits the error correcting code and the preamble code to the reader device 400 in any one scheme of the M-PAM and the M-QAM in which the modulation of the M level is performed. The load-modulator 270 includes an antenna 272, a chip 274, a power supply unit 276, and a charging unit 278. The charging part 278 is formed of a capacitor to charge a carrier transmitted from the reader device 400, and the power supply unit 286 communicates with the reader device 400 using current charged in the charging part 278. Here, the antenna 272 may be a sub-component of the load-modulator 270 or a scheme in which it is connected to the load-modulator 270.

The number of load-modulators 270 according to the exemplary embodiment of the present invention is N corresponding to the modulation of the M level. The number N of the load-modulators 270 is calculated by the following Equation.

<Equation>

In case of M-PAM: N=M

In case of M-QAM: N=2*sqrt(M)

For example, the load-modulator 270 for M-PAM uses a modulation scheme of a 8 level in order to use the thermometer decoder 260 of FIG. 6. Here, when M=8, k is 3 bits because of $\log_2(M)=\log_2(8)$. In this case, the number N of the load-modulators 270 is 8. In the case of a 4-level, four load-modulators 270 are used.

A scheme of using load-modulation and the reason why the above-mentioned M level should satisfy a condition of the equation will be described.

In order to transmit information in wireless, the passive RFID tag 200 uses a carrier continuously transmitted from the reader device 400 and the antenna 272 absorbs or reflects the received carrier wave signal using impedance of the antenna 272.

A frequency used in the passive RFID system 10 is mainly divided into a UHF band and an HF band. In communication of the RFID system 10 in the UHF band (900 MHz band), the RFID tag 200 communicates with the reader device 400 using a backscatter based load-modulator 270.

In communication of the RFID system 10 in the HF band, the RFID tag 200 communicates with the reader device 400 using a magnetic coupling based load-modulator 270. The signal transmission scheme of the RFID tag 200 using the load-modulator 270 in the UHF and HF bands described above is a modulation scheme in which the information is included and transmitted in the carrier signal received from the reader device 400 by adjusting the impedance of the antenna 272.

More specifically, in the signal transmission scheme of the RFID tag 200 using the load-modulator 270, the information is generally changed by changing the impedance of the antenna 272 into two states. In three impedance states which are 50 ohms or infinity, the information is transmitted in a scheme of absorbing or reflecting the carrier signal. Two states may be distinguished by 1 bit. That is, in the case in which the UHF passive RFID system 10 performs the back-scattering modulation using a single antenna 272 or in the case in which the HF passive RFID system 10 performs the modulation in the magnetic coupling scheme, since one bit is included in one symbol, bandwidth efficiency is not excellent.

Generally, in the wireless communication for efficiently using a bandwidth, schemes such as 4-PAM (2bits/symbol), QPSK (2bits/symbol), 16-QAM (4bits/symbol), 8-PSK (3bits/symbol), and the like, are used. These modulation technologies basically use a multi-M level. That is, an M level such as {0,1,2,3 . . . } rather than {0,1} is used. Therefore, in the load-modulator 270 according to the exemplary embodiment of the present invention, since two bits or more should be included in one symbol, the M level should satisfy a condition of the equation.

Meanwhile, the N load-modulators 270 according to the exemplary embodiment of the present invention uses any one modulation scheme of the M-PAM and M-QAM. Each antenna 272 of the N load-modulators 270 absorbs or reflects energy of the carrier transmitted from the reader device 400. The load-modulator 270 generates a PMA signal of the M level using the thermometer decoder 260 implementing the above <Table 3>. That is, the load-modulator 270 may perform the M-PAM modulation. On the other hand, the load-modulator 270 may perform the M-QAM modulation generating a QAM signal of the M level by adjusting a phase of the carrier reflected from the antenna 272.

Figure 7:
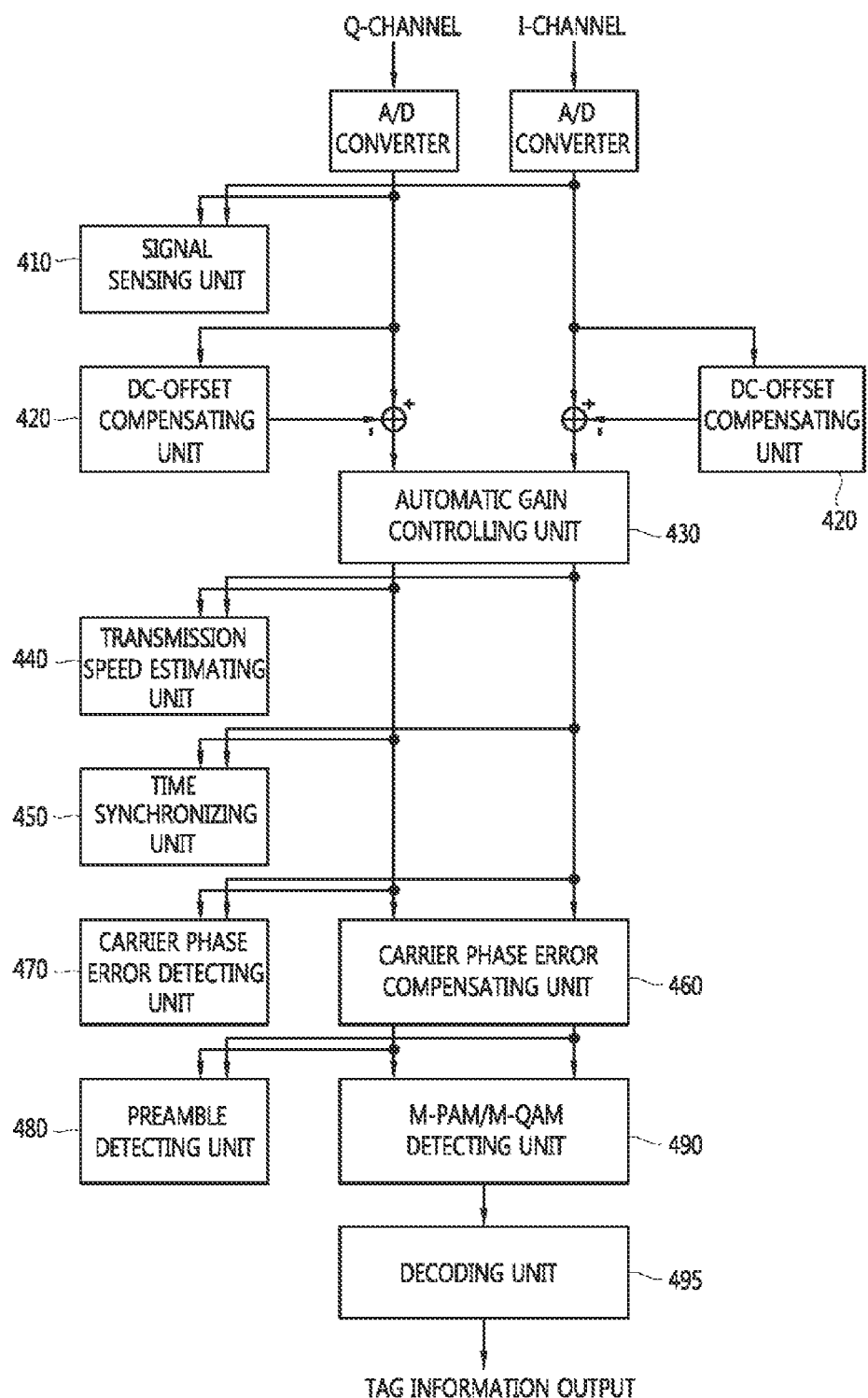
FIG. 7 is a block diagram showing a configuration of a reader device of the RFID system according to the exemplary embodiment of the present invention shown in FIG. 1.

FIG. 7 is a block diagram showing a configuration of a reader device of the RFID system according to the exemplary embodiment of the present invention shown in FIG. 1.

The reader device 400 includes a signal sensing unit 410, a DC-offset compensating unit 420, an automatic gain controlling unit 430, a transmission speed estimating unit 440, a time synchronizing unit 450, a carrier phase error compensating unit 460, a carrier phase error detecting unit 470, a preamble detecting unit 480, an M-PAM/M-QAM detecting unit 490, and a decoder 495. The reader device 400 communicates with the RFID tag 200 to recognize the information of the RFID tag 200.

The signal sensing unit 410 senses the signal transmitted from the RFID tag 200.

The DC-offset compensating unit 420 compensates for DC-offset noise generated in the signal transmitted from the RFID tag 200. The reader device 400 receives carrier information reflected or absorbed from the RFID tag 200, a carrier signal directly leaked from the reader device 400, a carrier signal reflected due other surrounding environments other than the RFID tag 200, and the like. Since a carrier signal for which encoding is not required among the carrier signals received in the reader device 400 has the same frequency as that of a reference frequency (L0) signal of the reader device 400, in the case in which it passes through a mixer, DC-offset noise is generated in an information signal. Therefore, the DC-offset compensating unit 420 should compensate for the DC-offset noise.

The transmission speed estimating unit 440 estimates a transmission speed from the RFID tag 200 before the preamble code is detected. In addition, the automatic gain controlling unit 430 is used in order to decode the M-PAM or M-QAM modulation signal and serves to prevent deterioration at the time of the decoding.

The time synchronizing unit 450 performs start timing synchronization for determining a symbol. The carrier phase error compensating unit 460 estimates a phase of the carrier and compensates for the estimated signal to perform synchronous demodulation.

The preamble detecting unit 480 detects the preamble code generated in the preamble signal generating unit 240 of the RFID tag 200. The preamble detecting unit 480 uses an correlator in order to detect the preamble code of the signal transmitted from the RFID tag 200.

The M-PAM/M-QAM detecting unit 490 detects a modulated M-PAM signal or M-QAM signal among the signals transmitted from the RFID tag 200 so that the M-PAM signal or the M-QAM signal modulated in the RFID tag 200 may be decoded in the decoder 495.

The decoder 495 decodes the error correcting code generated in the code generating unit 230 of the RFID tag 200. The decoder 495 decodes the error correcting code encoded in the error correcting code encoder 234.

Figure 8:
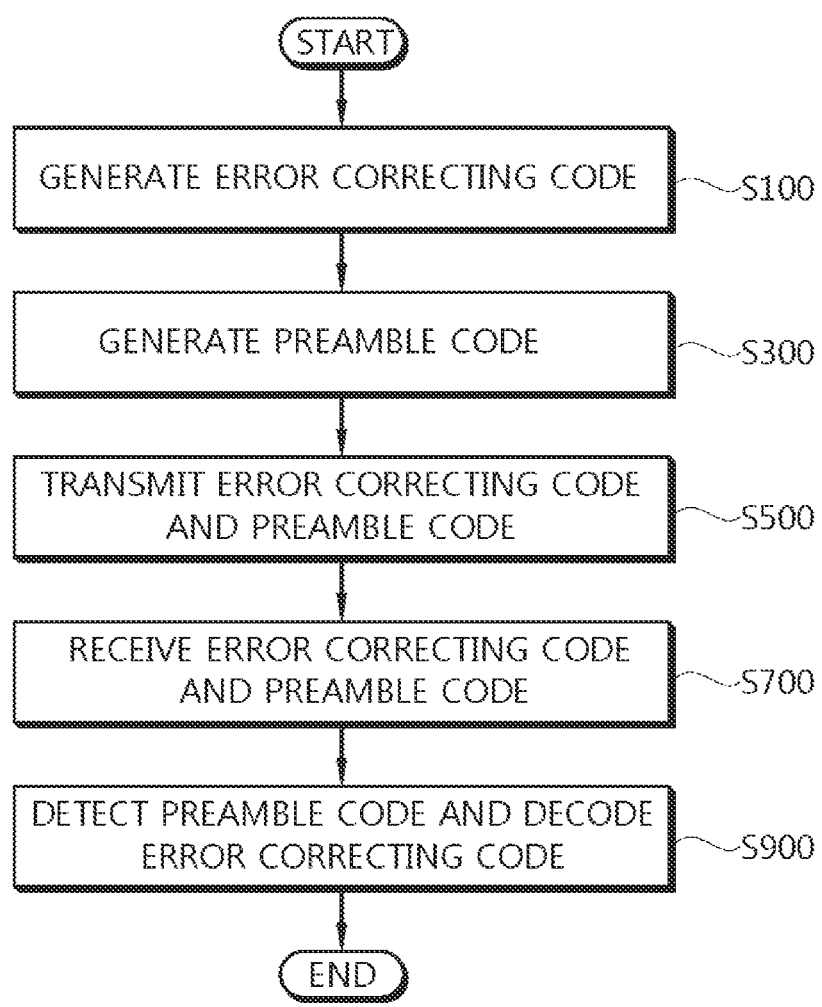
FIG. 8 is a communication flow chart of the RFID system according to the exemplary embodiment of the present invention.

An operation process of a communication method of the RFID system 10 according to the exemplary embodiment of the present invention having the above-mentioned configuration will be described with reference to FIG. 8.

First, a parity is added to date stored in the RFID tag 200 to generate an error correcting code (S100). Here, the error correcting code is encoded to an error correcting code by the error correcting code setter 232 and the error correcting code encoder 234. Then, a preamble code having auto-correlation characteristics of a delta function is generated (S200).

The error correcting code and the preamble code are transmitted to the reader device 400 using the N load-modulators 270 corresponding to an M level in any one scheme of the M-PAM and M-QAM in which modulation of the M level is performed (S300). Here, in the case of the M-PAM scheme, the load-modulator 270 generates a PAM signal of the M level using the thermometer decoder 260. On the other hand, in the case of the M-QAM scheme, the load-modulator 270 may generates a QAM signal of the M level by adjusting a phase of the carrier reflected from the antenna 272.

The reader device 400 receives a signal including the error correcting code and the preamble code transmitted from the RFID tag 200 (S700). The reader device 400 detects the preamble code and decodes the error correcting code, so as to be capable of recognizing the information of the RFID tag 200 from the signal transmitted from the RFID tag 200 (S900).

As set forth above, with the RFID system and the communication method thereof according to the exemplary embodiments of the present invention, the M-PAM or the M-QAM modulation scheme using the plurality of load-modulators, the error correcting code, and the preamble code having the auto-correlation characteristics close to the delta function are used, thereby making it possible to improve communication performance of the high speed transmission. As a result, various demands related to high speed recognition of a large number of individual items and reading/writing a large amount of information may be satisfied.

Although the exemplary embodiments of the present invention has been described with reference to the accompanying drawings, those skilled in the art will appreciate that various modifications and alterations may be made without departing from the spirit or essential feature of the present invention. Therefore, it should be understood that the above-mentioned embodiments are not restrictive, but are exemplary in all aspects. It should be interpreted that the scope of the present invention is defined by the following claims rather than the above-mentioned detailed description and all modifications or alterations deduced from the meaning, the scope, and equivalences of the claims are included in the scope of the present invention.

What is claimed is:

1. An RFID system comprising:
an RFID tag; and
a reader device communicating with the RFID tag,
wherein the RFID tag includes:
N load-modulators and N antennas communicating with the reader device in any one scheme of M-pulse amplitude modulation (M-PAM) and M-quadrature amplitude modulation (M-QAM) in which modulation of an M level is performed and operated corresponding to the M level;
a code generating unit adding a parity to data stored in the RFID tag to generate an error correcting code; and
a preamble signal generating unit generating a preamble code having auto-correlation characteristics of a delta function,
wherein N load-modulators and N antennas transmit the error correcting code and the preamble code to the reader device in any on scheme of M-pulse amplitude modulation (M-PAM) and M-quadrature amplitude modulation (M-QAM) in which modulation of the M level is performed and operated corresponding to the M level.

2. The RFID system of claim 1, wherein the number N of load-modulators according to the M level is calculated based on the following Equation:
for M-pulse amplitude modulation
in case of M-PAM:

$$N=M$$

in case of M-QAM:

$$N=2\sqrt{M}.$$

3. The RFID system of claim 1, wherein the error correcting code generated in the code generating unit is generated by adding the parity to the data stored in the RFID tag.

4. The RFID system of claim 3, wherein the code generating unit includes:
an error correcting code encoder encoding the error correcting code in an error correcting code scheme in which the parity is added to the data stored in the RFID tag to generate a codeword; and
an error correcting code setter setting a basic value by selecting any one of a plurality of error correcting codes so that the error correcting code encoder encodes the error correcting code.

5. The RFID system of claim 3, wherein the RFID tag further includes:
a memory storing the data of the RFID tag therein;
a packet generating unit generating a packet for responding to the reader device;
a multiplexer combining with each other the error correcting code, the preamble code, and the packet, respectively generated in the code generating unit, the preamble signal generating unit, and the packet generating unit, to generate a tag packet signal responding to a command of the reader device.

6. The RFID system of claim 5, wherein the RFID tag further includes a thermometer decoder disposed between the multiplexer and the N load-modulators, and wherein the load-modulator generates a pulse amplitude modulation (PAM) signal of the M level using the thermometer decoder.

7. The RFID system of claim 1, wherein the load-modulator generates a quadrature amplitude modulation (QAM) signal of the M level by adjusting a phase of a carrier reflected from the antenna.

8. The RFID system of claim 1, wherein the preamble signal generating unit includes a linear feedback shift register (LFSR).

9. The RFID system of claim 1, wherein the reader device includes:
a preamble detecting unit detecting the preamble code generated in the preamble signal generating unit of the RFID tag; and
a decoding unit decoding the error correcting code generated in the code generating unit of the RFID tag.

10. A communication method of an RFID system including an RFID tag and a reader device communicating with the RFID tag, the communication method comprising:
adding, in the RFID tag including a load-modulator, a parity to data stored in the RFID tag to generate an error correcting code;
generating, in the RFID tag, a preamble code having auto-correlation characteristics of a delta function;
transmitting, in the RFID tag, the error correcting code and the preamble code to the reader device using N load-modulators corresponding to an M level in any one scheme of M-pulse amplitude modulation (M-PAM) and M-quadrature amplitude modulation (M-QAM) in which modulation of the M level is performed; and
receiving, in the reader device, the error correcting code and the preamble code transmitted to detect the preamble code and decode the error correcting code.

11. The communication method of claim 10, wherein the number N of load-modulators according to the M level is calculated based on the following Equation:
in case of M-PAM:

$$N=M$$

in case of M-QAM:

$$i\ N=2\sqrt{M}.$$

12. The communication method of claim 10, wherein the error correcting code generated is generated by adding the parity to the data stored in the RFID tag.

13. The communication method of claim 11, wherein the error correcting code generated is an error correcting code generated by adding the parity to the data stored in the RFID tag.

14. The communication method of claim 10, wherein the RFID tag further includes a thermometer decoder, and wherein the load-modulator generates a pulse amplitude modulation (PAM) signal of the M level using the thermometer decoder.

15. The communication method of claim 11, wherein the RFID tag further includes a thermometer decoder, and wherein the load-modulator generates a pulse amplitude modulation (PAM) signal of the M level using the thermometer decoder.

16. The communication method of claim 10, wherein the RFID tag further includes the N load-modulators and N antennas corresponding to the N load-modulators, and wherein the load-modulator generates a quadrature amplitude modulation (QAM) signal of the M level by adjusting a phase of a carrier reflected from the antenna.

17. The communication method of claim 11, wherein the RFID tag further includes the N load-modulators and N antennas corresponding to the N load-modulators, and wherein the load-modulator generates a quadrature amplitude modulation (QAM) signal of the M level by adjusting a phase of a carrier reflected from the antenna.

* * * * *